United States Patent
Chandrasekaran et al.

(10) Patent No.: US 11,423,102 B2
(45) Date of Patent: Aug. 23, 2022

(54) LEARNING MODEL BASED SEARCH ENGINE

(71) Applicant: SAP SE, Walldorf (DE)

(72) Inventors: Vengateswaran Chandrasekaran, Santa Clara, CA (US); Sandeep Chakravarty, San Francisco, CA (US)

(73) Assignee: SAP SE, Walldorf (DE)

( * ) Notice: Subject to any disclaimer, the term of this patent is extended or adjusted under 35 U.S.C. 154(b) by 115 days.

(21) Appl. No.: 16/144,829

(22) Filed: Sep. 27, 2018

(65) Prior Publication Data

US 2020/0104419 A1 Apr. 2, 2020

(51) Int. Cl.
| | | |
|---|---|---|
| *G06F 17/30* | (2006.01) |
| *G06F 15/18* | (2006.01) |
| *G06F 16/9535* | (2019.01) |
| *G06N 20/00* | (2019.01) |
| *G06F 16/242* | (2019.01) |
| *G06F 16/901* | (2019.01) |

(52) U.S. Cl.
CPC ...... G06F 16/9535 (2019.01); G06F 16/2425 (2019.01); G06F 16/9017 (2019.01); G06N 20/00 (2019.01)

(58) Field of Classification Search
CPC ......... G06F 17/30867; G06F 17/30952; G06F 17/30395; G06F 16/9017; G06F 16/2425; G06F 16/9535; G06F 16/9532; G06N 20/00

See application file for complete search history.

(56) References Cited

U.S. PATENT DOCUMENTS

| | | | | |
|---|---|---|---|---|
| 8,165,146 B1* | 4/2012 | Melick | ............... | H04B 1/7163 370/428 |
| 8,667,007 B2* | 3/2014 | Tao | ............... | G06F 16/90324 707/769 |
| 10,366,119 B2* | 7/2019 | Yi | ............... | G06F 16/4387 |
| 2007/0250500 A1* | 10/2007 | Ismalon | ............... | G06F 16/355 |
| 2008/0295132 A1* | 11/2008 | Icho | ............... | H04N 21/8405 348/E7.061 |
| 2009/0234727 A1* | 9/2009 | Petty | ............... | G06F 16/24534 707/999.005 |
| 2012/0158851 A1* | 6/2012 | Kelmenson | ............... | G06F 16/951 709/205 |

(Continued)

*Primary Examiner* — Hosain T Alam
*Assistant Examiner* — Chongsuh Park
(74) *Attorney, Agent, or Firm* — Mintz Levin Cohn Ferris Glovsky and Popeo, P.C.

(57) ABSTRACT

A search engine may detect a user selecting an object associated with a first category subsequent to inputting a first search phrase including a keyword. In response, the search engine may update a learning model by at least incrementing a relevance score for an association between the keyword and the first category. The search engine may suggest keywords for completing a second search phrase based on the updated learning model. The search engine may further respond to the second search phrase by determining, based on the updated learning model, that the first category is more relevant to the first user than a second category. A search result of the second search phrase may be refined by eliminating, from objects matching the second search phrase, objects associated with the second category but not the first category.

20 Claims, 6 Drawing Sheets

(56) References Cited

U.S. PATENT DOCUMENTS

| | | | |
|---|---|---|---|
| 2013/0179436 A1* | 7/2013 | Yun | H04N 21/4728 |
| | | | 707/722 |
| 2014/0214895 A1* | 7/2014 | Higgins | G06F 16/9535 |
| | | | 707/770 |
| 2014/0358913 A1* | 12/2014 | Cai | G06F 16/185 |
| | | | 707/728 |
| 2015/0019566 A1* | 1/2015 | Jones | G06F 16/3322 |
| | | | 707/748 |
| 2016/0283585 A1* | 9/2016 | Zheng | G06F 16/345 |
| 2017/0308573 A1* | 10/2017 | Brisebois | G06F 16/24535 |
| 2018/0157753 A1* | 6/2018 | Dougherty | G06F 16/951 |

* cited by examiner

LEARNING MODEL BASED SEARCH ENGINE

TECHNICAL FIELD

The subject matter described herein relates generally to database processing and more specifically to a database based learning model for pruning search results.

BACKGROUND

A database (e.g., a relational database, a non-relational database, and/or the like) may be configured to store a plurality of electronic data records. These data records may be organized into various database objects including, for example, database tables, graphs, and/or the like. The database may be coupled with a database management system (DBMS) that supports a variety of operations for accessing the data records held in the database. These operations may include, for example, structure query language (SQL) statements, a graph query language statement, and/or the like.

SUMMARY

Systems, methods, and articles of manufacture, including computer program objects, are provided for pruning search results. In one aspect, there is provided a system. The system may include at least one data processor and at least one memory. The at least one memory may store instructions that cause operations when executed by the at least one data processor. The operations may include detecting, at a search engine, a first user selecting an object subsequent to inputting a first search phrase. The first search phrase may include a first keyword. The object may be associated with a first category. In response to detecting the first user selecting the object subsequent to inputting the first search phrase, the search engine may update a learning model by at least incrementing a first relevance score for a first association between the first keyword and the first category. In response to receiving, from the first user, a second search phrase, the search engine may determine, based at least on the updated learning model, that the first category is more relevant to the first user than a second category. The search engine may further refine a search result of the second search phrase by at least eliminating, from a plurality of objects matching the second search phrase, one or more objects associated with the second category but not the first category.

In some variations, one or more features disclosed herein including the following features can optionally be included in any feasible combination. The first category may be more relevant to the first user than the second category based at least on the first relevance score being higher than a second relevance score for a second association between the first keyword and the second category.

In some variations, the learning model may include a fact table storing the first association between the first keyword and the first category. The fact table may further store the first relevance score for the first association between the first keyword and the first category. In response to determining that the first association between the first keyword and the first category is absent from the fact table, the first association between the first keyword and the first category may be added to the fact table.

In some variations, the first association between the first keyword and the first category may be further associated with at least one dimension table. The at least one dimension table may store a second relevance score corresponding to a quantity of times the first user, users having a same user role as the first user, and/or users associated with a same entity as the first user selected objects from the first category subsequent to inputting a search phrase that includes the first keyword. In response to determining that the first user, the user role of the first user, and/or the entity associated with the first user is absent from the at least one dimension table, the first user, the user role of the first user, and/or the entity associated with the first user may be added to the at least one dimension table.

In some variations, the first category may be determined to be more relevant to the first user than the second category based at least on the second relevance score indicating that the first category is more relevant to the first user, users having the same user role as the first user, and/or users associated with the same entity as the first user.

In some variations, the fact table and the at least one dimension table may be stored in a database. The search engine may determine that the first category is more relevant to the first user than the second category by at least querying the database.

In some variations, in response to receiving, from a second user, a third search phrase, the first category may be determined to be more relevant to the second user than the second category based at least on the updated learning mode. The first category may be more relevant to the second user than the second category based at least on the second user having the same user role and/or being associated with the same entity as the first user.

In some variations, the search engine may respond to the first user inputting one or more characters from the second search phrase by at least suggesting, based at least on the updated learning model, the first keyword for completing the second search phrase. The first keyword may include the one or more characters. The first keyword may be suggested instead of a second keyword that also includes the one or more characters. The first keyword may be suggested instead of the second keyword based at least on the first relevance score being higher than a second relevance score for a second keyword.

In another aspect, there is provided a method. The method may include detecting, at a search engine, a first user selecting an object subsequent to inputting a first search phrase. The first search phrase may include a first keyword. The object may be associated with a first category. In response to detecting the first user selecting the object subsequent to inputting the first search phrase, the search engine may update a learning model by at least incrementing a first relevance score for a first association between the first keyword and the first category. In response to receiving, from the first user, a second search phrase, the search engine may determine, based at least on the updated learning model, that the first category is more relevant to the first user than a second category. The search engine may further refine a search result of the second search phrase by at least eliminating, from a plurality of objects matching the second search phrase, one or more objects associated with the second category but not the first category.

In some variations, one or more features disclosed herein including the following features can optionally be included in any feasible combination. The first category may be more relevant to the first user than the second category based at least on the first relevance score being higher than a second relevance score for a second association between the first keyword and the second category.

In some variations, the learning model may include a fact table storing the first association between the first keyword and the first category. The fact table may further store the first relevance score for the first association between the first keyword and the first category. In response to determining that the first association between the first keyword and the first category is absent from the fact table, the first association between the first keyword and the first category may be added to the fact table.

In some variations, the first association between the first keyword and the first category may be further associated with at least one dimension table. The at least one dimension table may store a second relevance score corresponding to a quantity of times the first user, users having a same user role as the first user, and/or users associated with a same entity as the first user selected objects from the first category subsequent to inputting a search phrase that includes the first keyword. In response to determining that the first user, the user role of the first user, and/or the entity associated with the first user is absent from the at least one dimension table, the first user, the user role of the first user, and/or the entity associated with the first user may be added to the at least one dimension table.

In some variations, the first category may be determined to be more relevant to the first user than the second category based at least on the second relevance score indicating that the first category is more relevant to the first user, users having the same user role as the first user, and/or users associated with the same entity as the first user.

In some variations, the fact table and the at least one dimension table may be stored in a database. The search engine may determine that the first category is more relevant to the first user than the second category by at least querying the database.

In some variations, in response to receiving, from a second user, a third search phrase, the first category may be determined to be more relevant to the second user than the second category based at least on the updated learning mode. The first category may be more relevant to the second user than the second category based at least on the second user having the same user role and/or being associated with the same entity as the first user.

In some variations, the method may further include responding to the first user inputting one or more characters from the second search phrase by at least suggesting, based at least on the updated learning model, the first keyword for completing the second search phrase. The first keyword may include the one or more characters. The first keyword may be suggested instead of a second keyword that also includes the one or more characters. The first keyword may be suggested instead of the second keyword based at least on the first relevance score being higher than a second relevance score for a second keyword.

In another aspect, there is provided a non-transitory computer readable medium that stores instructions. The instructions may cause operations when executed by at least one data processor. The operations may include detecting, at a search engine, a first user selecting an object subsequent to inputting a first search phrase. The first search phrase may include a first keyword. The object may be associated with a first category. In response to detecting the first user selecting the object subsequent to inputting the first search phrase, the search engine may update a learning model by at least incrementing a first relevance score for a first association between the first keyword and the first category. In response to receiving, from the first user, a second search phrase, the search engine may determine, based at least on the updated learning model, that the first category is more relevant to the first user than a second category. The search engine may further refine a search result of the second search phrase by at least eliminating, from a plurality of objects matching the second search phrase, one or more objects associated with the second category but not the first category.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to pruning search results, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
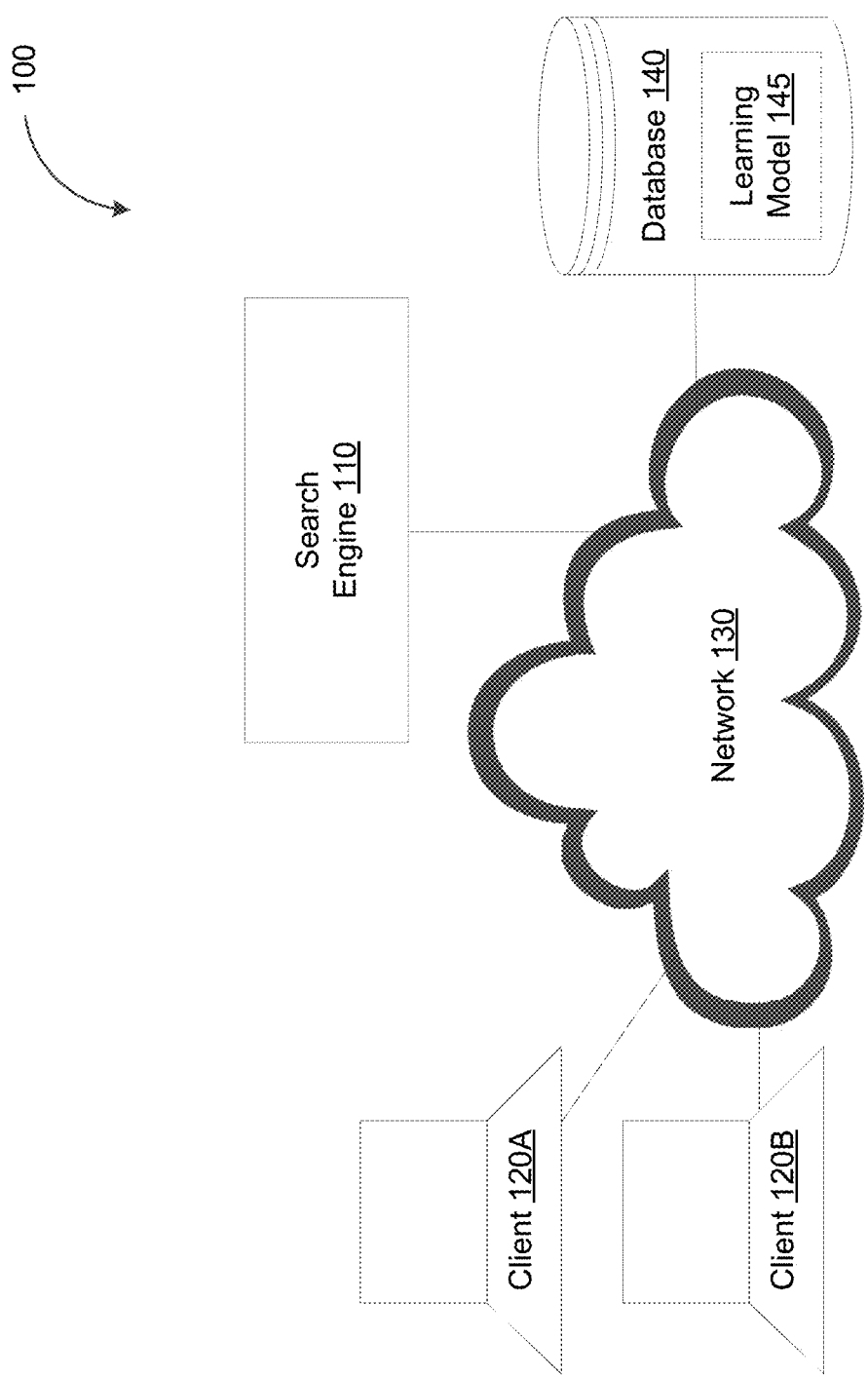
FIG. 1 depicts a system diagram illustrating a search system, in accordance with some example embodiments.

A search engine may be configured to identify one or more objects that match a search phrase. While a user is inputting the search phrase, the search engine may also provide one or more suggestions of keywords for completing the search phrase. For instance, in response to the user inputting a portion of a first keyword, the search engine may suggest the first keyword and/or a second keyword for completing a search phrase. Furthermore, the search engine may identify one or more objects that match the search phrase including the first keyword and/or the second keyword. However, a conventional search engine may fail to account for a user's intent including, for example, the different priorities of the keywords included in the search phrase. As such, a conventional search engine may suggest a first keyword instead of a second keyword for completing a search phrase even though the first keyword may be less relevant to the user than the second keyword. Alternatively and/or additionally, a conventional search engine may return every object matching the keywords a search phrase, including objects from object categories that are irrelevant to the user.

In some example embodiments, a search engine may be configured to apply a learning model when suggesting keywords for completing a search phrase and/or identifying objects matching a search phrase. The learning model may be generated and/or updated based on past events at the search engine. These past events may include search events in which one or more users input a search phrase. Furthermore, these past events may include selection events responsive to the search events. For example, a search event may transpire when a user inputs a search phrase, thereby causing the search engine to identify one or more objects matching the search phrase. Meanwhile, a corresponding selection event may transpire when the user selects at least one of the objects identified as matching the search phrase. The user may select an object by adding the object to a cart, adding the object to a wish list, purchasing the object, and/or the like.

In some example embodiments, the learning model may be stored as one or more tables in a database. For instance, the one or more tables may store associations between keywords and object categories. Each association between a keyword and a category may further be associated with a relevance score. Accordingly, updating the learning model may include querying the database in order to add, to the one or more tables, an association between a keyword and a category when a user selects an object (e.g., adds the object to a cart, adds the object to a wish list, purchases the object, and/or the like) from the category subsequent to the user having input the keyword, for example, as part of a search phrase. Alternatively and/or additionally, the learning model may be updated by at least querying the database to increment the relevance score of the association between the keyword and the category each time an object from the category is selected by a user subsequent to the user having input the keyword. The relevance score may correspond to a measure of how relevant a keyword is to a user and/or similar users sharing at least some common attributes with the user including, for example, users having a same user role, users associated with a same entity, and/or the like. Moreover, the relevance score may correspond to a measure of how relevant a keyword is to a category for the user and/or similar users sharing at least some common attributes with the user.

In some example embodiments, the one or more tables storing the learning model may include a fact table and one or more dimension tables. The fact table and the one or more dimension tables may form a star database schema. For example, each row in the fact table may hold an association between a keyword and a category. Furthermore, each row in the fact table may be associated with one or more dimension tables further associating a keyword and a corresponding category with specific users, user roles, and/or entities. For example, a row in the fact table may correspond to a keyword and a category. The row in the fact table may be associated with a first dimension table storing the individual users who have selected an object from that category subsequent to inputting the keyword. The first dimension table may further store a quantity of times each user selected an object from the category subsequent to inputting the keyword. Alternatively and/or additionally, the row in the fact table may be associated with a second dimension table storing the different user roles that have selected an object from the category subsequent to inputting the keyword as well as the quantity of times each user role selected an object from the category subsequent to inputting the keyword. The row in the fact table may further be associated with a third dimension table storing the individual entities that have selected an object from the category subsequent to inputting the keyword as well as the quantity of times each entity selected an object from the category subsequent to inputting the keyword.

As noted, the search engine may apply the learning model when suggesting keywords for completing a search phrase being input by a user and/or when identifying objects matching the search phrase. Accordingly, in some example embodiments, the search engine may identify, based at least on the fact table and/or the plurality of dimension tables, keywords that are most frequently input by the same user, users having a same role as the user, and/or users associated with a same entity as the user. Alternatively and/or additionally, the search engine may apply the learning model when identifying objects that match a search phrase input by the user. For instance, the search engine may identify, based at least on the fact tables and/or the plurality of dimension tables, one or more object categories that are most relevant to the user, users having a same role as the user, and/or users associated with a same entity as the user. When a first category is more relevant than a second category to a user, a user role, and/or an entity, the learning model may indicate that the user, the user role, and/or the entity have selected more objects from the first category than from the second category. The search engine may further prune the search phrase input by the user by at least eliminating, from the objects identified as matching the search phrase, those objects not belonging to the one or more object categories that are most relevant to the user.

FIG. 1 depicts a system diagram illustrating a search system 100, in accordance with some example embodiments. Referring to FIG. 1, the search system 100 may include a search engine 110 that is communicatively coupled with a database 140 via a network 130. Furthermore, the search engine 110 may be communicatively coupled, via the network 130, with a plurality of clients including, for example, a first client 120A, a second client 120B, and/or the like. It should be appreciated that the first client 120A and/or the second client 120B may be any type of processor and memory based device including, for example, a cellular phone, smart phone, a tablet, a laptop computer, a desktop, a workstation, and/or the like. Meanwhile, the network 130 may be any wired and/or wireless network including, for example, a public land mobile network (PLMN), a local area network (LAN), a wide area network (WAN), a virtual local area network (VLAN), the Internet, and/or the like. The database 140 may be any type of database including, for example, a graph database, an in-memory database, a relational database, a non-SQL (NoSQL) database, and/or the like.

In some example embodiments, the search engine 110 may generate and/or update a learning model 145 based on past events at the search engine 110 including, for example, search events, selection events, and/or the like. The learning model 145 may be updated to include associations between keywords and objects. For instance, a search event may occur at the search engine 110 when the search engine 110 receives, from the first client 120A, a search phrase. The search phrase may include one or more keywords such as, for example, a first keyword $k_1$, a second keyword $k_2$, and/or the like. In response to receiving the search phrase from the first client 120A, the search engine 110 may identify one or more objects that match the search phrase including, for example, a first object $p_1$, a second object $p_2$, and/or the like.

A selection event may occur at the search engine 110 when the search engine 110 determines that the first client 120A has selected at least one of the objects identified as matching the search phrase. For instance, the search engine 110 may determine that the first client 120A has selected the first object $p_1$ when the first client 120A, for example, adds the first object $p_1$ to a cart, adds the first object $p_1$ to a wish list, purchases the first object $p_1$, and/or the like. The search engine 110 may update the learning model 145 based on the first client 120A having selected the first object $p_1$ subsequent to inputting the search phrase including the first keyword $k_1$ and the second keyword $k_2$. For example, the learning model 145 may be updated to indicate that the first keyword $k_1$ and/or the second keyword $k_2$ may be relevant to the first client 120A and/or users who are similar to the first client 120A including, for example, users having a same user role as the first client 120A, users associated with a same entity as the first client 120A, and/or the like. Furthermore, the learning model 145 may be updated to indicate that a first category $C_1$ of the first object $p_1$ may be relevant to the first client 120A, users having a same user role as the first client 120A, and/or users associated with a same entity as the first client 120A.

For example, the search engine 110 may update the learning model 145 by at least adding, to the learning model 145, an association between the first category $C_1$ and each of the first keyword $k_1$ and the second keyword $k_2$. Alternatively and/or additionally, the search engine 110 may update the learning model 145 by at least incrementing a relevance score for the association between the first keyword $k_1$ and the first category $C_1$ as well as a relevance score for the association between the second keyword $k_2$ and the first category $C_1$. The relevance score may be incremented to reflect a quantity of times the first keyword $k_1$ and/or the second keyword $k_2$ was input as part of a search phrase as well as a quantity of times an object from the first category $C_1$ was selected after the first keyword $k_1$ and/or the second keyword $k_2$ was input as part of a search phrase. Accordingly, it should be appreciated that the relevance score associated with each of the first keyword $k_1$ and the second keyword $k_2$ may correspond to a measure of how relevant the first keyword $k_1$ and/or the second keyword $k_2$ may be to the first client 120A and/or similar users who share some common attributes with the first client 120A including, for example, users having a same user role as the first client 120A, users associated with a same entity as the first client 120A, and/or the like. For example, the first keyword $k_1$ may be more relevant to the first client 120A and/or users that are similar to the first client 120A (e.g., same user role, same entity, and/or the like) than the second keyword $k_2$ if the first keyword $k_1$ has a higher relevance score than the second keyword $k_2$ due to the first client 120A and/or users that are similar to the first client 120A having input the first keyword $k_1$ more frequently than the second keyword $k_2$.

As noted, the relevance score for the associations between the first category $C_1$ and each of the first keyword $k_1$ and the second keyword $k_2$ may also correspond to a measure of how relevant different keywords may be with respect to different object categories. For example, the first keyword $k_1$ may be more relevant to the first category $C_1$ than the second keyword $k_2$ if more objects from the first category $C_1$ were selected (e.g., added to a cart, added to a wish list, purchased, and/or the like) subsequent to the search engine 110 receiving a search phrase that includes the first keyword $k_1$ than the search engine 110 receiving a search phrase that includes the second keyword $k_2$. Alternatively and/or additionally, the first keyword $k_1$ may be more relevant to the first category $C_1$ than a second category $C_2$ if, subsequent to the search engine 110 receiving a search phrase that includes the first keyword $k_1$, more objects were selected from the first category $C_1$ than from the second category $C_2$.

The search engine 110 may apply the learning model 145 when suggesting one or more keywords for completing a search phrase. For example, while the first client 120A is inputting a search phrase, the first client 120A may input a one or more of the characters from an alphanumeric string forming a keyword. The search engine 110 may respond to the first client 120A inputting the one or more characters by identifying, based at least on the learning model 145, the first keyword $k_1$ as being relevant to the first client 120A. The search engine 110 may identify the first keyword $k_1$ instead of the second keyword $k_2$ that also include the same characters input by the first client 120A because the learning model 145 may indicate that the first keyword $k_1$ is more relevant to the first client 120A than the second keyword $k_2$.

As noted, the learning model 145 may include an association between the first keyword $k_1$ and the first client 120A and/or similar users sharing at least some common attributes with the first client 120A (e.g., same user role, same entity, and/or the like). This association may indicate that the first keyword $k_1$ is relevant to the first client 120A, users having a same user role as the first client 120A, and/or users associated with a same entity as the first client 120A. By contrast, the second keyword $k_2$ may be irrelevant to the first client 120A because the learning model 145 may not include an association between the second keyword $k_2$ and the first client 120A and/or similar users that share at least some common attributes with the first client 120A. Accordingly, the search engine 110 may respond to the first client 120A inputting the one or more characters by suggesting, to the first client 120A, the first keyword $k_1$ for completing a search phrase instead of the second keyword $k_2$.

Alternatively and/or additionally, the search engine 110 may suggest, to the first client 120A, the first keyword $k_1$ for completing the search phrase instead of the second keyword $k_2$ based on the first keyword $k_1$ having a higher relevance score than the second keyword $k_2$. As noted, the relevance score associated with the first keyword $k_1$ and the second keyword $k_2$ may correspond to a quantity of times the first client 120A and/or similar users sharing at least some common attributes with the first client 120A (e.g., same user role, same entity, and/or the like) have input the first keyword $k_1$ and/or the second keyword $k_2$ as part of a search phrase. The first keyword $k_1$ may have a higher relevance score than the second keyword $k_2$ if the first client 120A and/or similar users sharing at least some common attributes with the first client 120A have input the first keyword $k_1$ more frequently than the second keyword $k_2$. Accordingly, the search engine 110 may suggest, to the first client 120A, the first keyword $k_1$ for completing the search phrase because the respective relevance scores of the first keyword $k_1$ and the second keyword $k_2$ may indicate that the first keyword $k_1$ is more relevant to the first client 120A than the second keyword $k_2$.

Alternatively and/or additionally, the search engine 110 may also apply the learning model 145 when suggesting one or more keywords for completing a search phrase being input by the second client 120B. The second client 120B may be a similar user sharing at least some common attributes with the first client 120A. For instance, the second client 120B may have a same user role as the first client 120A and/or may be associated with a same entity as the first client 120A. Accordingly, the search engine 110 may also respond to the second client 120B inputting one or more characters by identifying, based at least on the learning model 145, the first keyword $k_1$ as being relevant to the second client 120B. It should be appreciated that the search engine 110 may identify, based on the learning model 145, the first keyword $k_1$ as being relevant to the second client 120B instead of the second keyword $k_2$ because the second client 120B may be a similar user that share at least some common attributes with the first client 120A including, for example, a same user role, a same entity, and/or the like.

In some example embodiments, the search engine 110 may also apply the learning model 145 when identifying one or more objects that match a search phrase. For example, the search engine 110 may receive, from the first client 120A, a search phrase that includes the first keyword $k_1$. The search engine 110 may apply the learning model 145 in order to identify one or more categories of objects associated with the first keyword $k_1$ that are also most relevant to the first client 120A, users having a same user role as the first client 120A, and/or users associated with a same entity as the first client 120A.

For example, the learning model 145 may include an association between the first category $C_1$ and the first keyword $k_1$ indicating that the first client 120A had selected an object from the first category $C_1$ subsequent to inputting a search phrase that includes the first keyword $k_1$. The learning model 145 may further associate the association between the first object $p_1$ and the first keyword $k_1$ with the first client 120A and/or similar users sharing at least some common attributes with the first client 120A (e.g., same user role, same entity, and/or the like). Each of these associations may further be associated with a relevance score corresponding to a quantity of times the first client 120A and/or similar users sharing at least some common attributes with the first client 120A has selected an object from the first category $C_1$ subsequent to inputting a search phrase that includes the first keyword $k_1$. These associations and/or the corresponding relevance scores may indicate how relevant objects from the first category $C_1$ are to the first client 120A when the first client 120A inputs a search phrase that includes the first keyword $k_1$.

The search engine 110 may prune the search phrase input by the first client 120A based on the one or more categories of objects that are determined to be most relevant to the first client 120A and/or similar users who share at least some common attributes (e.g., same user role, same entity, and/or the like) with the first client 120. For example, the search engine 110 may determine, based on the learning model 145, the first category $C_1$ as being more relevant to the first client 120A, users having a same user role as the first client 120A, and/or users associated with a same entity as the first client 120A than a second category $C_2$. The learning model 145 may indicate, for example, that the relevance score of the association between the first category $C_1$ and the first keyword $k_1$ is higher than the relevance score of the association between the second category $C_2$ and the first keyword $k_1$ for the first client 120A and/or similar users that share at least some common attributes with the first client 120A. Accordingly, instead of returning every object matching the search phrase input by the first client 120A, the search engine 110 may eliminate, from the search result, objects that belong to, for example, the second category $C_2$ that is less relevant to the first client 120A than the first category $C_1$. In doing so, the search engine 110 may increment the relevance of the search results by at least returning, to the first client 120A, objects from the first category $C_1$ but not objects from the second category $C_2$.

Referring again to FIG. 1, the learning model 145 may be stored at the database 140. In some example embodiments, the learning model 145 may be stored, at the database 140, as one or more tables including, for example, a fact table and one or more dimension tables. The fact table and the one or more dimension tables may form a star database schema.

Figure 2:
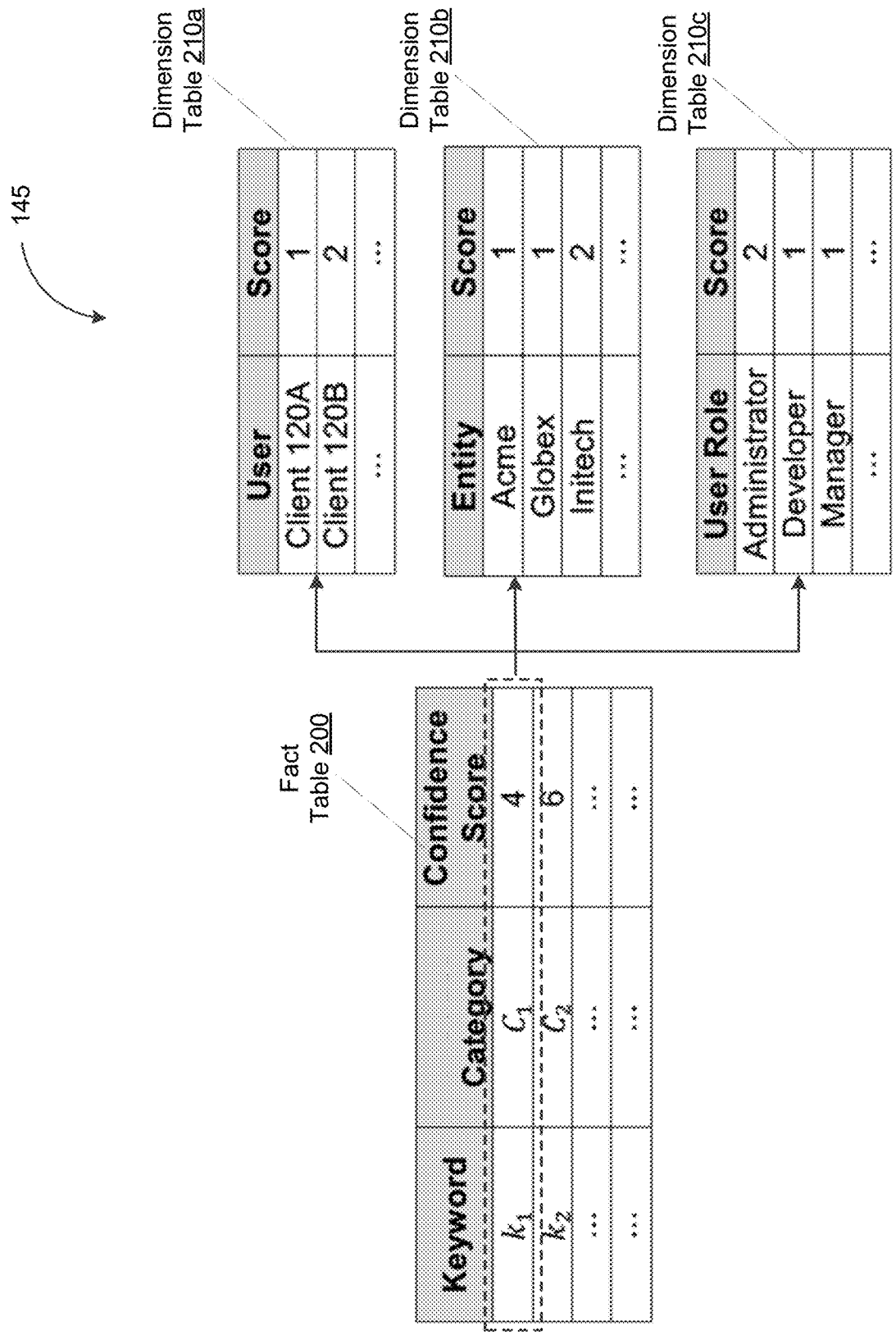
FIG. 2 depicts an example of a learning model stored at a database, in accordance with some example embodiments.

To further illustrate, FIG. 2 depicts an example of the learning model 145 stored at the database 140, in accordance with some example embodiments. As shown in FIG. 2, the learning model 145 may be stored, at the database 140, as a plurality of tables including, for example, a fact table 200, a first dimension table 240a, a second dimension table 240b, and a third dimension table 240c. The fact table 200 may hold a plurality of associations between keywords and object categories including, for example, an association between the first keyword $k_1$ and the first category $C_1$, an association between the second keyword $k_2$ and the second category $C_2$, and/or the like.

Furthermore, FIG. 2 shows that the fact table 200 may store a relevance score for each of the associations between keywords and object categories. For instance, the fact table 200 may store a relevance score of "4" for the association between the first keyword $k_1$ and the first category $C_1$. The relevance score of "4" may indicate that subsequent to the search engine 110 receiving a search phrase that includes the first keyword $k_1$, an object from the first category $C_1$ was selected a total of four times. Alternatively and/or additionally, the fact table 200 may further store a relevance score of 6 for the association between the second keyword $k_2$ and the second category $C_2$. This relevance score may indicate that an object from the second category $C_2$ was selected a total of six times subsequent to the search engine 110 receiving a search phrase that includes the second keyword $k_2$.

In some example embodiments, each association between a keyword and a category in the fact table 200 may further be associated with one or more dimension tables. For example, as shown in FIG. 2, the association between the first keyword $k_1$ and the first category $C_1$ may be associated with a first dimension table 210a, a second dimension table 210b, and a third dimension table 210c.

The first dimension table 210a may further associate the first keyword $k_1$ and the first category $C_1$ with specific users that have selected an object from the first category $C_1$ subsequent to inputting a search phrase that includes the first keyword $k_1$. Furthermore, as shown in FIG. 2, the first dimension table 210a may include, for each user, a relevance score indicative of a quantity of times each user has selected an object from the first category $C_1$ subsequent to inputting a search phrase that includes the first keyword $k_1$. For example, the first dimension table 210a may include a relevance score of "1" for the first client 120A. The relevance score of "1" may indicate that the first client 120A selected an object from the first category $C_1$ once after having input a search phrase that includes the first keyword $k_1$. Alternatively and/or additionally, the first dimension table 210a may include a relevance score of "2" for the second client 120B. This relevance score may indicate that the second client 120B selected an object from the first category $C_1$ twice after having input a search phrase that includes the first keyword $k_1$.

Referring again to FIG. 2, the second dimension table 210b may associate the first keyword $k_1$ and the first category $C_1$ with specific entities that have selected an object from the first category $C_1$ subsequent to inputting a search phrase that includes the first keyword $k_1$. As shown in FIG. 2, the second dimension table 210b may include, for each entity, a relevance score indicative of a quantity of times each entity has selected an object from the first category $C_1$ subsequent to inputting a search phrase that includes the first keyword $k_1$. For example, the second dimension table 210b may include a relevance score of "1" for the entity Acme and the entity Globex. This relevance score may indicate that users from the entity Acme and the entity Globex have each selected an object from the first category $C_1$ once after having input a search phrase that includes the first keyword $k_1$. Alternatively and/or additionally, the second dimension table 210b may include a relevance score of "2" for the entity Initech. The relevance score of "2" may indicate that users associated with the entity Initech have selected an object from the first category $C_1$ twice after having input a search phrase that includes the first keyword $k_1$.

Furthermore, FIG. 2 shows that the third dimension table 210c may associate the first keyword $k_1$ and the first category $C_1$ with specific user roles that have selected an object from the first category $C_1$ subsequent to inputting a search phrase that includes the first keyword $k_1$. The third dimension table 210c may include, for each user role, a relevance score indicative of a quantity of times each user role has selected an object from the first category $C_1$ subsequent to inputting a search phrase that includes the first keyword $k_1$. For example, the third dimension table 210c may include a relevance score of "2" for the user role administrator, thereby indicating that users acting as an administrator have each selected an object from the first category $C_1$ twice after having input a search phrase that includes the first keyword $k_1$. Alternatively and/or additionally, the third dimension table 210c may include a relevance score of "1" for the user role developer and the user role manager. This relevance score may indicate that users acting as a developer or as a manager have each selected an object from the first category $C_1$ once after having input a search phrase that includes the first keyword $k_1$.

In some example embodiments, the search engine 110 may suggest, based at least on the learning model 145, one or more keywords for completing a search phrase. As shown in FIG. 2, the learning model 145 may include the fact table 200, the first dimension table 210a, the second dimension table 210b, and/or the third dimension table 210c. For example, while the first client 120A is inputting a search phrase, the first client 120A may input one or more characters from an alphanumeric string forming a keyword. The search engine 110 may respond to the first client 120A inputting the one or more characters by at least determining that the one or more characters match the first keyword $k_1$ and the second keyword $k_2$. For instance, the one or more characters input by the first client 120A may match the first keyword $k_1$ and the second keyword $k_2$ if the one or more characters are part of the first keyword $k_1$ and the second keyword $k_2$.

The search engine 110 may determine, based at least on the learning model 145, a respective relevance of the first keyword $k_1$ and the second keyword $k_2$ to the first client 120A and/or similar users sharing at least some common attributes with the first client 120A (e.g., same user role, same entity, and/or the like). Moreover, the search engine 110 may suggest, to the first client 120A, the first keyword $k_1$ instead of the second keyword $k_2$ for completing the search phrase if the first keyword $k_1$ is determined to be more relevant to the first client 120A and/or similar users sharing at least some attributes with the first client 120A. For example, the first keyword $k_1$ maybe more relevant than the second keyword $k_2$ if the learning model 145 indicates that the first keyword $k_1$ is associated with a higher relevance score than the second keyword $k_2$ for the first client 120A and/or similar users that share at least some common attributes with the first client 120A. The first keyword $k_1$ may be associated with a higher relevance score than the second keyword $k_2$ if the first client 120A and/or similar users that share at least some common attributes with the first client 120A have input the first keyword $k_1$ more frequently than the second keyword $k_2$.

In some example embodiments, the search engine 110 may also identify, based at least on the learning model 145, one or more objects that match a search phrase input by the first client 120A. For example, the search phrase may include the first keyword $k_1$ and/or the second keyword $k_2$. The search engine 110 may determine, based at least on the learning model 145, one or more object categories that are most relevant to the first client 120A and/or similar users who share at least some common attributes with the first client 120A (e.g., same entity, same user role, and/or the like). Instead of returning, to the first client 120A, every object that match the search phrase input by the first client 120A, the search engine 110 may prune the search results by at least eliminating, from the search results, objects belonging to object categories that are not relevant to the first client 120A and/or similar users who share at least some common attributes with the first client 120A.

For example, the first client 120A may input a search phrase that includes the first keyword $k_1$. The learning model 145 may include a relevance score indicating a quantity of times the first client 120A and/or similar users that share at least some common attributes with the first client 120A (e.g., same entity, same user role, and/or the like) have selected an object from the first category $C_1$ subsequent to inputting a search phrase that includes the first keyword $k_1$. Alternatively and/or additionally, the learning model 145 may a relevance score indicating a quantity of times the first client 120A and/or similar users that share at least some common attributes with the first client 120A have selected an object from the second category $C_2$ subsequent to inputting a search phrase that includes the first keyword $k_1$. The search engine 110 may determine, based on the respective relevance scores, that the first category $C_1$ may be more relevant than the second category $C_2$ for the first client 120A and/or similar users that share at least some common attributes with the first client 120A. For instance, the first category $C_1$ may be associated with a higher relevance score than the second category $C_2$ when the first client 120A and/or similar users sharing at least some common attributes with the first client 120A have selected an object more frequently from the first category $C_1$ than from the second category $C_2$. Accordingly, the search engine 110 may prune the search results for the search phrase from the first client 120A by at least eliminating, from the search results, objects from the second category $C_2$.

Figure 3:
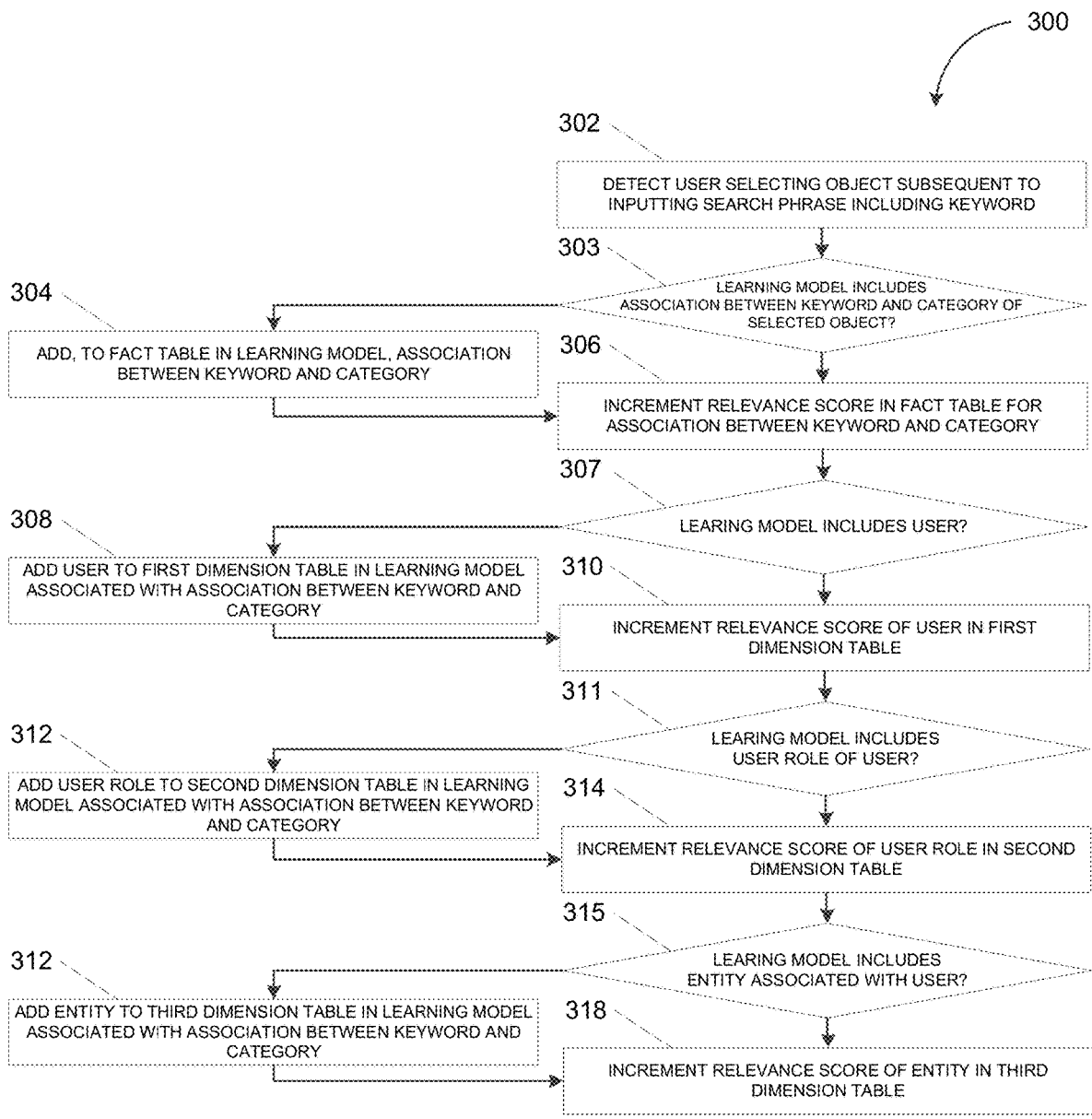
FIG. 3 depicts a flowchart illustrating a process for updating a learning model, in accordance with some example embodiments.

FIG. 3 depicts a flowchart illustrating a process 300 for updating a learning model, in accordance with some example embodiments. Referring to FIGS. 1-3, the process 300 may be performed by the search engine 110 in order to update, for example, the learning model 145.

At 302, the search engine 110 may detect a user selecting an object subsequent to inputting a search phrase including a keyword. In some example embodiments, the search engine 110 may detect a search event associated with the first client 120A in which the first client 120A inputs a search phrase that includes, for example, the first keyword $k_1$. Furthermore, subsequent to the search event, the search engine 110 may detect a selection event associated with the first client 120A. For example, the search engine 110 may detect a selection event when the first client 120A selects one or more objects subsequent to inputting the search phrase that includes the first keyword $k_1$. The one or more objects may be associated with a category including, for example, the first category $C_1$.

At 303, the search engine 110 may determine whether a learning model includes an association between the keyword and a category of the object selected by the user. For example, the search engine 110 may query the database 140 to determine whether the learning model 145 includes an association between the first keyword $k_1$ and the first category $C_1$.

At 303-N, the search engine 110 may determine that the learning model does not include an association between the keyword and the category of the object selected by the user. For example, the search engine 110 may determine that the learning model 145 does not include the association between the first keyword $k_1$ and the first category $C_1$. As such, at 304, the search engine 110 may add, to a fact table in the learning model, the association between the keyword and the category of the object selected by the user. Furthermore, at 306, the search engine 110 may increment a relevance score in the fact table for the association between the keyword and the category of the object selected by the user. For instance, the search engine 110 may query the database 140 to in order to add, to the fact table 200, the association between the first keyword $k_1$ and the first category $C_1$. Moreover, the search engine 110 may further query the database 140 to increment the relevance score that is associated with the association between the first keyword $k_1$ and the first category $C_1$. As shown in FIG. 2, the association between the first keyword $k_1$ and the first category $C_1$ as well as the corresponding relevance score may occupy a row in the fact table 200. Meanwhile, the relevance score for the association between the first keyword $k_1$ and the first category $C_1$ may indicate a quantity of times a user selected an object from the first category $C_1$ subsequent to inputting a search phrase that includes the first keyword $k_1$. Accordingly, the relevance score for the association between the first keyword $k_1$ and the first category $C_1$ may correspond to a measure of how relevant objects from the first category $C_1$ may be to a search phrase that includes the first keyword $k_1$.

Alternatively, at 303-Y, the search engine 110 may determine that the learning model includes an association between the keyword and the category selected by the user. As such, the process 300 may continue at operation 306 during which the search engine 110 may increment a relevance score in the fact table for the association between the keyword and the category of the object selected by the user. For instance, if the fact table 200 in the learning model 145 already includes the association between the first keyword $k_1$ and the first category $C_1$, the search engine 110 may query the database 140 to increment the relevance score for the association between the first keyword $k_1$ and the first category $C_1$. The selection of one or more objects from the first category $C_1$ may increment the relevance of the first object $C_1$ relative to the first keyword $k_1$. Accordingly, the search engine 110 may increment the relevance score of the association between the first keyword $k_1$ and the first category $C_1$ in order to reflect the increment in the relevance of the first category $C_1$ relative to the first keyword $k_1$.

At 307, the search engine 110 may determine whether the learning model includes the user. For example, the search engine 110 may query the database 140 to determine whether the learning model 145 includes the first client 120A.

At 307-N, the search engine 110 may determine that the learning model does not include the user. For instance, the search engine 110 may determine that the learning model 145 does not include the first client 120A. As such, at 308, the search engine 110 may add the user to a first dimension table in the learning model that is associated with the association between the keyword and the category of the selected object. Furthermore, at 310, the search engine 110 may increment a relevance score of the user in the first dimension table. For example, the search engine 110 may query the database 140 to add, to the first dimension table 210a, the first client 120A. The search engine 110 may further query the database 140 to increment a relevance score associated with the first client 120A in the first dimension table 210a. In some example embodiments, the relevance score associated with the first client 120A in the first dimension table 210a may correspond to a quantity of times the first client 120A selected an object from the first category $C_1$ subsequent to inputting a search phrase that includes the first keyword $k_1$. Accordingly, the search engine 110 may increment the relevance score of the first client 120A in the first dimension table 210a each time the first client 120A selects an object from the first category $C_1$ subsequent to inputting a search phrase that includes the first keyword $k_1$.

Alternately, at 307-Y, the search engine 110 may determine that the learning model includes the user. When the search engine 110 determines that the learning model already includes the user, the process 300 may resume at operation 310 and the search engine 110 may increment the relevance score of the user in the first dimension table. For instance, if the search engine 110 determines that the learning model 145 already includes the first client 120A, the search engine 110 may increment the relevance score of the first client 120A in the first dimension table 210a. As noted, the relevance score for the first client 120A in the first dimension table 210a may correspond to a quantity of times the first client 120A selected an object from the first category $C_1$ subsequent to inputting a search phrase that includes the first keyword $k_1$. The search engine 110 may query the database 140 to increment the relevance score associated with the first client 120A in order to reflect an increment in the relevance of the first category $C_1$ to the first client 120A.

At 311, the search engine 110 may determine whether the learning model includes a user role of the user. In some example embodiments, the search engine 110 may query the database 140 to determine whether the learning model 145 includes a user role of the first client 120A. For example, as shown in FIG. 2, the user role of the first client 120A may be that of an administrator, developer, manager, and/or the like.

At 311-N, the search engine 110 may determine that the learning model does not include the user role of the user. For instance, the search engine 110 may determine that the learning model 145 does not include the user role of the first client 120A. As such, at 312, the search engine 110 may add the user role of the user to a second dimension table in the learning model that is associated with the association between the keyword and the category of the selected object. Moreover, at 314, the search engine 110 may increment a relevance score of the user role in the second dimension table. For example, if the learning model 145 does not already include the user role of the first client 120A, the search engine 110 may query the database 140 to add, to the second dimension table 210b, the user role of the first client 120A. The search engine 110 may further increment the relevance score of the user role in the second dimension table 210b in order to reflect an increment in a relevance of the first category $C_1$ to users that user role. As noted, the relevance score of the user role in the second dimension table 210b may correspond to a quantity of times a user having that user role selected an object from the first category $C_1$ subsequent to inputting a search phrase that includes the first keyword $k_1$.

Alternatively, at 311-Y, the search engine 110 may determine that the learning model includes the user role of the user. As such, the process 300 may continue at 314 and the search engine 110 may increment the relevance score of the user role in the second dimension table. For example, if the search engine 110 determines that the learning model 145 already includes the user role of the first client 120A, the search engine 110 may query the database 140 to increment the relevance score of the user role in the second dimension table 210b. The search engine 110 may increment the relevance score of the user role in order to reflect an increment in the relevance of the first category $C_1$ to users having that user role.

At 315, the search engine 110 may determine whether the learning model includes an entity associated with the user. For example, the search engine 110 may query the database 140 to determine whether the learning model 145 includes the entity that is associated with the first client 120A. As shown in FIG. 2, the entity that is associated with the first client 120A may be an organization, a company, an institution, and/or the like.

At 315-N, the search engine 110 may determine that the learning model does not include the entity associated with the user. For example, the search engine 110 may determine that the learning model 145 does not include the entity associated with the first client 120A. As such, at 316, the search engine 110 may add the entity associated with the user to a third dimension table in the learning model that is associated with the association between the keyword and the category of the selected object. Furthermore, at 318, the search engine 110 may increment a relevance score of the entity in the third dimension table. For instance, the search engine 110 may query the database 140 to add, to the third dimension table 210c, the entity associated with the first client 120A. The search engine 110 may further query the database 140 to increment the relevance score associated with the entity to correspond to a quantity of times a user associated with the entity selected an object from the first category $C_1$ subsequent to inputting a search phrase that includes the first keyword $k_1$.

Alternatively, at 315-Y, the search engine 110 may determine that the learning model includes the entity associated with the user. As such, the process 300 may continue at 318 and the search engine 110 may increment the relevance score of the entity in the third dimension table. For instance, if the search engine 110 determines that the learning model 145 already includes the entity associated with the first client 120A, the search engine 110 may query the database 140 to increment the relevance score of the entity associated with the first client 120A. The relevance score of the entity may be incremented in order to reflect a quantity of times users from that entity selected an object from the first category $C_1$ subsequent to inputting a search phrase that includes the first keyword $k_1$.

Figure 4A:
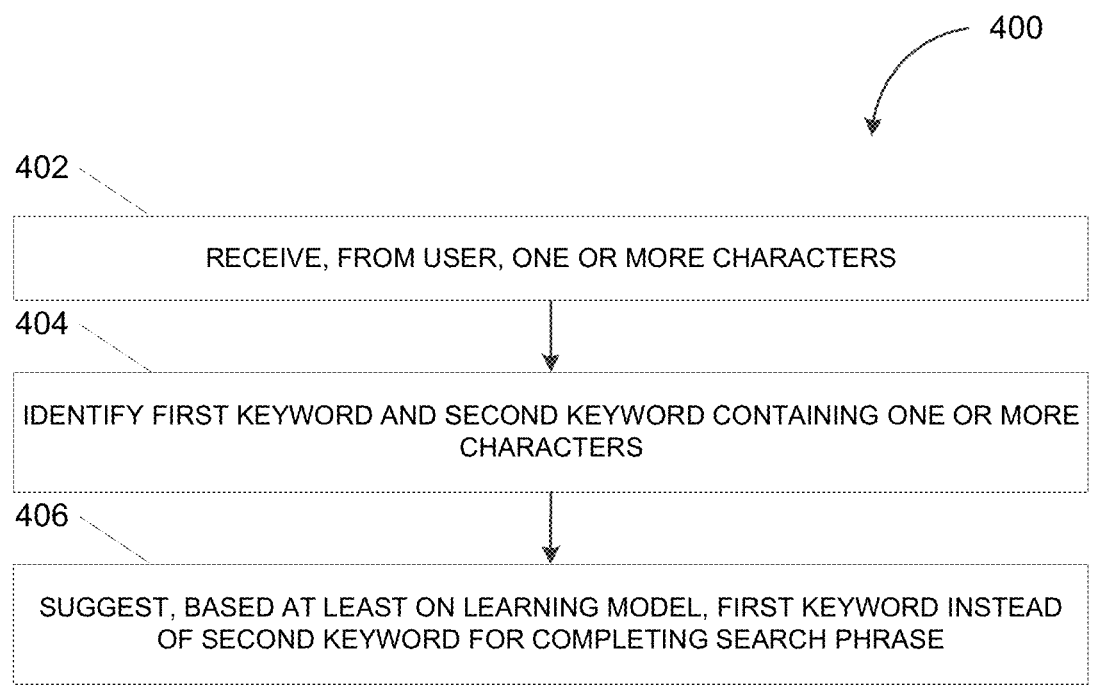
FIG. 4A depicts a flowchart illustrating a process for suggesting a keyword for completing a search phrase, in accordance with some example embodiments.

FIG. 4A depicts a flowchart illustrating a process 400 for suggesting a keyword for completing a search phrase, in accordance with some example embodiments. Referring to FIGS. 1-3 and 4A, the process 400 may be performed by the search engine 110.

At 402, the search engine 110 may receive, from a user, one or more characters. For example, while the first client 120A is inputting a search phrase, the first client 120A may input one or more characters. The one or more characters may be one or more alphanumeric characters forming a string that correspond to a keyword in the search phrase.

At 404, the search engine 110 may identify a first keyword and a second keyword containing the one or more characters. For example, the search engine 110 may identify the first keyword $k_1$ and the second keyword $k_2$ as including the one or more characters input by the first client 120A.

At 406, the search engine 110 may suggest, based at least on a learning model, the first keyword instead of the second keyword for completing a search phrase. In some example embodiments, the search engine 110 may determine, based at least on the learning model 145, that the first keyword $k_1$ may be more relevant to the first client 120A than the second keyword $k_2$. For example, the search engine 110 may determine, based on the fact table 200 in the learning model 145, that the first keyword $k_1$ is associated with a higher relevance score than the second keyword $k_2$. Accordingly, the search engine 110 may suggest the first keyword $k_1$ instead of the second keyword $k_2$ for completing the search phrase being input by the first client 120A.

Alternatively and/or additionally, the search engine 110 may suggest the first keyword $k_1$ instead of the second keyword $k_2$ based on the respective relevance of the first keyword $k_1$ and the second keyword $k_2$ for the first client 120A and/or similar users who share at least some common attributes with the first client 120A. For example, the search engine 110 may determine, based at least on the first dimension table 210a, the second dimension table 210b, and/or the third dimension table 210c, that the first keyword $k_1$ is more relevant than the second keyword $k_2$ for the first client 120A, users having a same user role as the first client 120A, and/or users associated with a same entity as the first client 120A. The search engine 110 may be configured to suggest the first keyword $k_1$ instead of the second keyword $k_2$ for completing the search phrase being input by the first client 120A based at least on the first keyword $k_1$ being more relevant than the second keyword $k_2$ for the first client 120A, users having a same user role as the first client 120A, and/or users associated with a same entity as the first client 120A. It should be appreciated that when the search engine 110 suggests multiple keywords for completing the search phrase being input by the first client 120A, the keywords suggested by the search engine 110 may be ordered based on the respective relevance score of each keyword. For instance, the search engine 110 may provide, to the first client 120A, a list of keywords in which the keywords with higher relevance scores may appear before the keywords with lower relevance scores.

According to some example embodiments, the learning model 145 may not include the first client 120A. As such, the search engine 110 may suggest the first keyword $k_1$ for completing the search phrase being input by the first client 120A based at least on the first keyword $k_1$ being more relevant to users having a same user role as the first client 120A and/or users associated with a same entity as the first client 120A. For example, if the search engine 110 determines that the first client 120A is absent from the first dimension table 210a, the search engine 110 may determine, based on the second dimension table 210b, a respective relevance of the first keyword $k_1$ and the second keyword $k_2$ for users having a same user role as the first client 120A. Alternatively and/or additionally, if the search engine 110 determines that the user role of the first client 120A is absent from the second dimension table 210b, the search engine 110 may determine, based at least on the third dimension table 210c, a respective relevance of the first keyword $k_1$ and/or the second keyword $k_2$ for users associated with a same entity as the first client 120A. As noted, the search engine 110 may suggest the first keyword $k_1$ for completing the search phrase being input by the first client 120A based at least on the first keyword $k_1$ being more relevant than the second keyword $k_2$ for the first client 120A, users having a same user role as the first client 120A, and/or users associated with a same entity as the first client 120A.

Figure 4B:
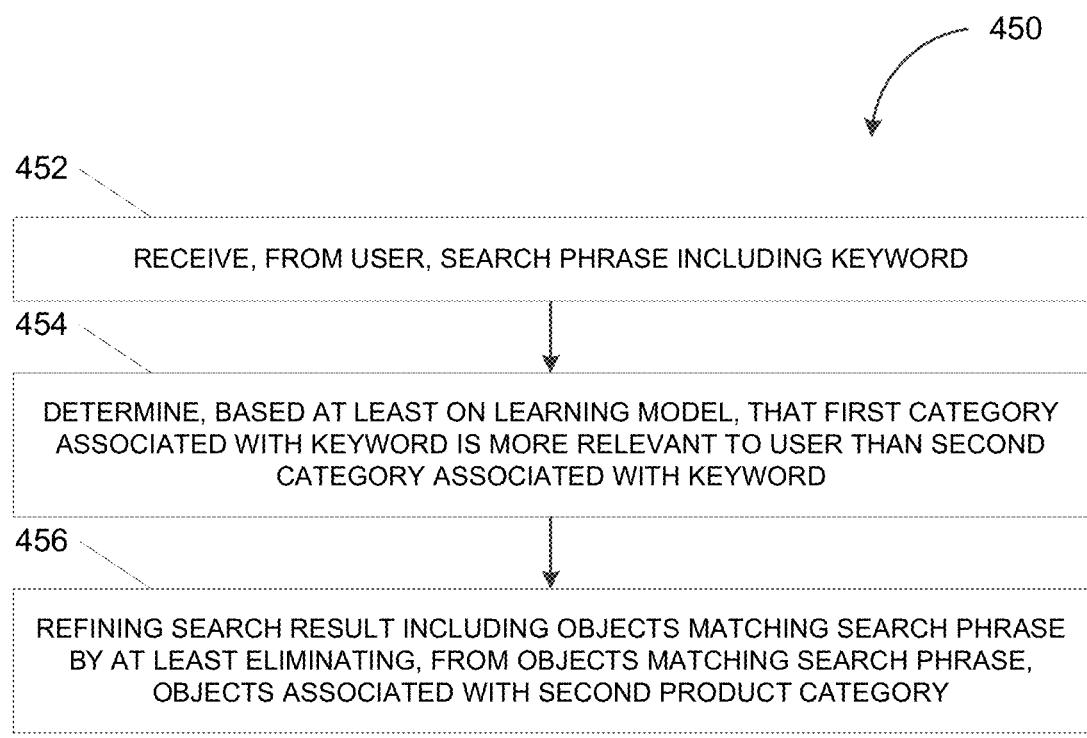
FIG. 4B depicts a flowchart illustrating a process for pruning the search results responsive to a search phrase, in accordance with some example embodiments.

FIG. 4B depicts a flowchart illustrating a process 450 for pruning the search results responsive to a search phrase, in accordance with some example embodiments. Referring to FIGS. 1-3 and 4B, the process 450 may be performed by the search engine 110.

At 452, the search engine 110 may receive, from a user, a search phrase that includes a keyword. For example, the search engine 110 may receive, from the first client 120A, a search phrase that includes the first keyword $k_1$.

At 454, the search engine 110 may determine, based at least on a learning model, that a first category associated with the keyword is more relevant than a second category associated with the keyword. For example, the search engine 110 may determine, based at least on the learning model 145, that the first category $C_1$ associated with the first keyword $k_1$ may be more relevant than the second category $C_2$ associated with the first keyword $k_1$. The search engine 110 may determine that the first category $C_1$ is more relevant than the second category $C_2$ based at least on the fact table 200 in the learning model 145 including an association between the first keyword $k_1$ and the first category $C_1$ but not an association between the first keyword $k_1$ and the second category $C_2$. Alternatively and/or additionally, the search engine 110 may determine that the first category $C_1$ is more relevant than the second category $C_2$ based at least on the association between the first keyword $k_1$ and the first category $C_1$ having a higher relevance score than the association between the first keyword $k_1$ and the second category $C_2$. As noted, the relevance score for the association between the first keyword $k_1$ and the first category $C_1$ may correspond to a quantity of times an object from the first category $C_1$ was selected subsequent to the input of a search phrase that includes the first keyword $k_1$. Meanwhile, the relevance score for the association between the second keyword $k_2$ and the first category $C_1$ may correspond to a quantity of times an object from the second category $C_2$ was selected subsequent to the input of a search phrase that includes the first keyword $k_1$.

According to some example embodiments, the search engine 110 may determine, based at least on the learning model 145, that the first category $C_1$ is more relevant than the second category $C_2$ for the first client 120A and/or similar users who share at least some common attributes with the first client 120A. For example, the search engine 110 may determine, based at least on the first dimension table 210a, the second dimension table 210b, and/or the third dimension table 210c, that the first category $C_1$ is more relevant than the second category $C_2$ for the first client 120A, users having a same user role as the first client 120A, and/or users associated with a same entity as the first client 120A. The learning model 145 including, for example, the first dimension table 210a, the second dimension table 210b, and/or the third dimension table 210c, may indicate a respective quantity of times the first client 120A, users having a same user role as the first client 120A, and/or users associated with a same entity as the first client 120A selected an object from the first category $C_1$ and/or the second category $C_2$ subsequent to inputting a search phrase that includes the first keyword $k_1$.

In some example embodiments, the learning model 145 may not include the first client 120A. As such, the search engine 110 may determine that the first category $C_1$ is more relevant than the second category $C_2$ for the first client 120A based at least on the first category $C_1$ being more relevant to users having a same user role as the first client 120A and/or users associated with a same entity as the first client 120A. For example, if the search engine 110 determines that the first client 120A is absent from the learning model 145 (e.g., the first dimension table 210a and/or the like), the search engine 110 may determine, based on the learning model 145 (e.g., second dimension table 210b and/or the like), a relevance of the first category $C_1$ and/or a relevance of the second category $C_2$ for users having a same user role as the first client 120A.

Alternatively and/or additionally, if the search engine 110 determines that the user role of the first client 120A is absent from the learning model 145 (e.g., the second dimension table 210b and/or the like), the search engine 110 may determine, based at least on the learning model 145 (e.g., the third dimension table 210c and/or the like), a relevance of the first category $C_1$ and/or the relevance of the second category $C_2$ for users associated with a same entity as the first client 120A. As noted, the search engine 110 may determine that the first category $C_1$ is more relevant than the second category $C_2$ for the first client 120A based at least on the first category $C_1$ being more relevant for users having a same user role as the first client 120A and/or users associated with a same entity as the first client 120A.

At 456, the search engine 110 may refine search results including objects that match the search phrase by at least eliminating, from the objects matching the search phrase, objects from the second category. In some example embodiments, the search engine 110 may refine the search results of the search phrase input by the first client 120A based at least on the first category $C_1$, which may be determined to be more relevant than the second category $C_2$ for the first client 120A, users having a same user role as the first client 120A, and/or users associated with a same entity as the first client 120A. For example, instead of a search result that includes every object that match the search phrase input by the first client 120A, the search engine 110 may eliminate, from the objects that match the search phrase, objects from the second category $C_2$. In doing so, the search engine 110 may return, to the first client 120A, search results that are more relevant to the first client 120A including, for example, objects from the first category $C_1$ but not objects from the second category $C_2$.

Figure 5:
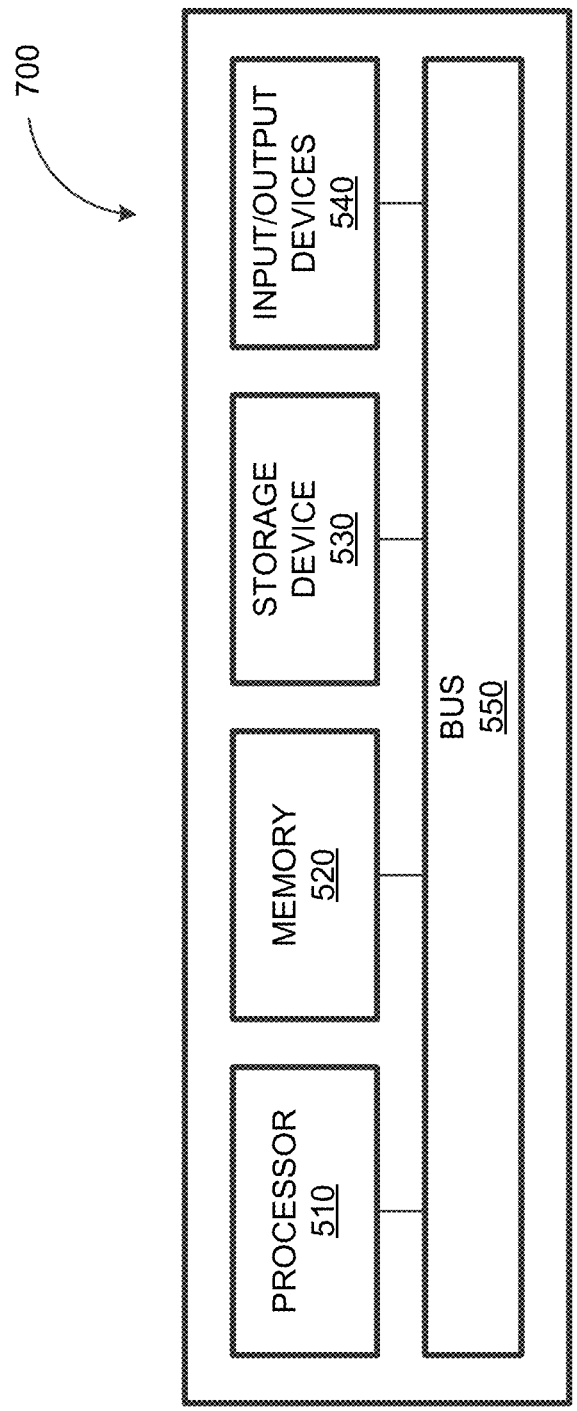
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the search engine 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the search engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state drive, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing objects and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program object, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more objects. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        detecting, at a search engine, a selection subsequent to inputting a first search phrase that includes a first keyword, the selection including an object associated with a first category;
        in response to detecting the selection the object subsequent to inputting the first search phrase, updating, by the search engine, a learning model including a plurality of relevance scores, the plurality of relevance scores including a first relevance score for corresponding to a first frequency of the first keyword being input by a first user and a second relevance score corresponding a second frequency of a second keyword being input being input by the first user, the plurality of relevance scores further including a third relevance score corresponding to a first quantity of times the first user selected objects from the first category subsequent to inputting the first keyword and a fourth relevance score corresponding to a second quantity of times the first user selected objects from a second category subsequent to inputting the first keyword, the updating of the learning model includes incrementing, based at least on the first search phrase including the first keyword but not the second keyword, the first relevance score but not the second relevance score, the updating of the learning model further includes incrementing, based at least on the selected object being associated with the first category and not the second category, the third relevance score but not the fourth relevance score, the plurality of relevance scores further including a fifth relevance score corresponding to a third quantity of times users with having a same user role and/or associated with a same entity as the first user selected objects from the first category subsequent to inputting the first keyword, and the updating of the learning model includes incrementing the fifth relevance score; and
        in response to receiving a second search phrase including the first keyword and the second keyword, determining, based at least on the updated learning model, that the first keyword is more relevant than the second keyword and that the first category is more relevant than the second category, and refining, by the search engine, a search result of the second search phrase by at least eliminating, from a plurality of objects matching the second search phrase, one or more objects associated with the second keyword and the second category.

2. The system of claim 1, wherein the first category is more relevant than the second category based at least on the third relevance score being higher than the fourth relevance score.

3. The system of claim 1, wherein the learning model includes a fact table storing a first association between the first keyword and the first category, the third relevance score for the first association between the first keyword and the first category, a second association between the first keyword and the second category, and the fourth relevance score for the second association between the first keyword and the second category.

4. The system of claim 3, further comprising:
    in response to determining that the first association between the first keyword and the first category is absent from the fact table, adding, to the fact table, the first association between the first keyword and the first category.

5. The system of claim 3, wherein the first association between the first keyword and the first category is further associated with one or more dimension tables storing the fifth relevance score.

6. The system of claim 5, further comprising:
    in response to determining that the first user, a user role of the first user, and/or an entity associated with the first user is absent from the one or more dimension tables, adding, to the the one or more dimension tables, the first user, the user role of the first user, and/or the entity associated with the first user.

7. The system of claim 5, wherein the first category is determined to be more relevant to the first user than the second category further based at least on the fifth relevance score.

8. The system of claim 5, wherein the fact table and the one or more dimension tables are stored in a database, and wherein the search engine determines that the first category is more relevant to the first user than the second category by at least querying the database.

9. The system of claim 5, further comprising:
    in response to receiving, from a second user, a third search phrase, determining, based at least on the updated learning model, that the first category is also more relevant to the second user than the second category, the first category being more relevant to the second user than the second category based at least on the second user having the same user role and/or being associated with the same entity as the first user.

10. The system of claim 1, further comprising:

responding to an input including one or more characters from the second search phrase by at least suggesting, based at least on the updated learning model, the first keyword for completing the second search phrase, the first keyword being suggested instead of the second keyword based at least on the first relevance score of the first keyword being higher than the relevance score for the second keyword.

11. A method, comprising:

detecting, at a search engine, a selection subsequent to inputting a first search phrase that includes a first keyword, the selection including an object associated with a first category;

in response to detecting the selection the object subsequent to inputting the first search phrase, updating, by the search engine, a learning model including a plurality of relevance scores, the plurality of relevance scores including a first relevance score for corresponding to a first frequency of the first keyword being input by a first user and a second relevance score corresponding a second frequency of a second keyword being input being input by the first user, the plurality of relevance scores further including a third relevance score corresponding to a first quantity of times the first user selected objects from the first category subsequent to inputting the first keyword and a fourth relevance score corresponding to a second quantity of times the first user selected objects from a second category subsequent to inputting the first keyword, the updating of the learning model includes incrementing, based at least on the first search phrase including the first keyword but not the second keyword, the first relevance score but not the second relevance score, the updating of the learning model further includes incrementing, based at least on the selected object being associated with the first category and not the second category, the third relevance score but not the fourth relevance score, the plurality of relevance scores further including a fifth relevance score corresponding to a third quantity of times users with having a same user role and/or associated with a same entity as the first user selected objects from the first category subsequent to inputting the first keyword, and the updating of the learning model includes incrementing the fifth relevance score; and in response to receiving a second search phrase including the first keyword and the second keyword, determining, based at least on the updated learning model, that the first keyword is more relevant than the second keyword and that the first category is more relevant than the second category, and refining, by the search engine, a search result of the second search phrase by at least eliminating, from a plurality of objects matching the second search phrase, one or more objects associated with the second keyword and the second category.

12. The method of claim 11, wherein the first category is more relevant than the second category based at least on the third relevance score being higher than the fourth relevance score.

13. The method of claim 11, wherein the learning model includes a fact table storing a first association between the first keyword and the first category, the third relevance score for the first association between the first keyword and the first category, a second association between the first keyword and the second category, and the fourth relevance score for the second association between the first keyword and the second category.

14. The method of claim 13, further comprising:

in response to determining that the first association between the first keyword and the first category is absent from the fact table, adding, to the fact table, the first association between the first keyword and the first category.

15. The method of claim 13, wherein the first association between the first keyword and the first category is further associated with one or more dimension tables storing the fifth relevance score.

16. The method of claim 15, further comprising:

in response to determining that the first user, a user role of the first user, and/or an entity associated with the first user is absent from the one or more dimension tables, adding, to the the one or more dimension tables, the first user, the user role of the first user, and/or the entity associated with the first user.

17. The method of claim 15, wherein the first category is determined to be more relevant to the first user than the second category further based at least on the fifth relevance score.

18. The method of claim 15, wherein the fact table and the one or more dimension tables are stored in a database, and wherein the search engine determines that the first category is more relevant to the first user than the second category by at least querying the database.

19. The method of claim 11, further comprising:

responding to an input including one or more characters from the second search phrase by at least suggesting, based at least on the updated learning model, the first keyword for completing the second search phrase, the first keyword being suggested instead of the second keyword based at least on the first relevance score of the first keyword being higher than a third the relevance score for the second keyword.

20. A non-transitory computer readable medium storing instructions, which when executed by at least one data processor, result in operations comprising:

detecting, at a search engine, a selection subsequent to inputting a first search phrase that includes a first keyword, the selection including an object associated with a first category;

in response to detecting the selection the object subsequent to inputting the first search phrase, updating, by the search engine, a learning model including a plurality of relevance scores, the plurality of relevance scores including a first relevance score for corresponding to a first frequency of the first keyword being input by a first user and a second relevance score corresponding a second frequency of a second keyword being input being input by the first user, the plurality of relevance scores further including a third relevance score corresponding to a first quantity of times the first user selected objects from the first category subsequent to inputting the first keyword and a fourth relevance score corresponding to a second quantity of times the first user selected objects from a second category subsequent to inputting the first keyword, the updating of the learning model includes incrementing, based at least on the first search phrase including the first keyword but not the second keyword, the first relevance score but not the second relevance score, the updating of the learning model further includes incrementing, based at least on the selected object being associated with the first category and not the second category, the third relevance score but not the fourth relevance score, the plurality of relevance scores further including a fifth relevance score corresponding to a third quantity of times users with having a same user role and/or associated with a same entity as the first user selected objects from the first category subsequent to inputting the first keyword, and the updating of the learning model includes incrementing the fifth relevance score; and in response to receiving a second search phrase including the first keyword and the second keyword, determining, based at least on the updated learning model, that the first keyword is more relevant than the second keyword and that the first category is more relevant than the second category, and refining, by the search engine, a search result of the second search phrase by at least eliminating, from a plurality of objects matching the second search phrase, one or more objects associated with the second keyword and the second category.

* * * * *